United States Patent [19]

Schmehr et al.

[11] Patent Number: 4,836,694
[45] Date of Patent: Jun. 6, 1989

[54] BEARING SEAL

[75] Inventors: Peter R. Schmehr, Bubingen; Edmund Sander, Riegelsberg, both of Fed. Rep. of Germany

[73] Assignee: SKF Gleitlager GmbH, Fed. Rep. of Germany

[21] Appl. No.: 178,607

[22] Filed: Apr. 7, 1988

[30] Foreign Application Priority Data

Apr. 9, 1987 [DE] Fed. Rep. of Germany ....... 8705293

[51] Int. Cl.$^4$ .................. F16C 33/74; F16J 15/32; F16J 15/54
[52] U.S. Cl. ............................. 384/145; 277/44; 277/174; 277/184; 277/186; 384/151; 384/486
[58] Field of Search ............... 384/130, 137, 145–147, 384/151, 153, 203, 206, 477, 484, 486, 481, 482; 277/47–49, 35, 44, 184, 186, 174

[56] References Cited

U.S. PATENT DOCUMENTS

| | | | |
|---|---|---|---|
| 2,621,091 | 12/1952 | Hickling | 384/484 |
| 2,834,616 | 5/1958 | Gebert et al. | 384/486 X |
| 3,848,938 | 11/1974 | Stella | 384/146 |
| 4,147,367 | 4/1979 | Smith et al. | 384/477 X |
| 4,525,082 | 6/1985 | Brandenstein et al. | 277/48 X |
| 4,544,168 | 10/1985 | Hans et al. | 384/486 X |

Primary Examiner—Thomas R. Hannon
Attorney, Agent, or Firm—Eugene E. Renz, Jr.

[57] ABSTRACT

Seal for bearings having inner and outer rings comprising a sealing ring mounted in a cylindrical recess in one of the bearing rings and defining a radial clearance between the axially oriented shank of a retaining ring having an L-shaped cross section and the bore surface of a cylindrical recess in one of the bearing rings. The sealing ring being fixed in a bore of the retaining ring and projecting laterally from the retaining ring and resting with axial pretension against a radial surface of the one bearing ring.

6 Claims, 1 Drawing Sheet

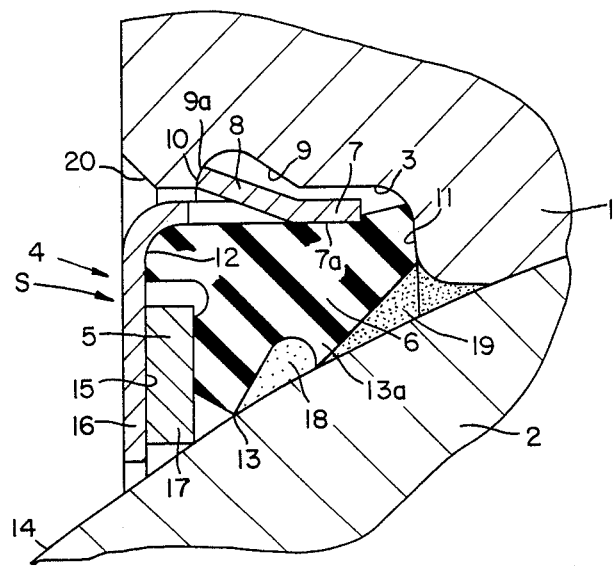

BEARING SEAL

FIELD OF THE INVENTION

The present invention relates to bearing seals particularly adapted for use in ball and socket joints and which generally comprise at least one sealing ring and retaining ring mounted in a cylindrical recess in one of the bearing rings.

BACKGROUND OF THE INVENTION

Seals of this general description are not new per se. For example, West German Utility Model No. 82-18,351 shows a seal design adapted to be pressed into a cylindrical recess in one of the bearing rings to seat the seal. These assemblies have certain disadvantages and drawbacks. For example, the pressing operation can result in deformation of the bearing ring particularly in small bearings. Moreover, assembly of these known seals is relatively complicated and time consuming.

SUMMARY OF THE INVENTION

With the foregoing in mind, it is an object of the present invention to provide a novel seal assembly which is characterized by novel features of construction and arrangement whereby the seal may be easily mounted without deformation of the bearing ring and which provides an extremely effective seal against even the harshest environmental influences, such as mud, dust, sea water, etc. To this end, in accordance with the present invention, a radial clearance is provided between the axially oriented shank of the retaining ring which is of generally L-shaped cross section and the bore surface of the cylindrical recess in one of the bearing rings. The sealing ring is fixed in the bore of the retaining ring and projects laterally from the retaining ring and engages with axial pretension against a radial surface of one of the bearing rings. By this construction, after the seal is pushed into the cylindrical bore of one of the bearing rings, it is supported on the bearing ring radially by a friction fit and axially by a form fit.

In accordance with another important feature of the present invention, a wiper ring made of metal is mounted between the outer sealing lip of the sealing ring and the inner surface of the radially oriented shank of the retaining ring in such a manner to provide an axial pretension but having the freedom to slide radially. The sequential configuration and arrangement of these sealing elements produces an effective high-performance seal.

BRIEF DESCRIPTION OF THE DRAWINGS

These and other objects of the present invention and the various features and details of the operation and construction thereof are hereinafter more fully set forth with reference to the accompanying drawings, wherein:

The FIGURE is a partial transverse section through a ball and socket joint incorporating a seal in accordance with the present invention.

DETAILED DESCRIPTION OF THE PREFERRED EMBODIMENT

The drawing shows a ball and socket joint comprising an outer ring 1 and an inner ring 2 incorporating a seal assembly in accordance with the present invention. The seal assembly generally designated S is mounted in a cylindrical recess 3 in the outer ring 1 and comprises a retaining ring 4, a wiper ring 5 and a sealing ring 6 made of a plastic material. Retaining ring 4 is of L-shaped cross section and has an axially directed shank 7 having a plurality of elastic tongues 8. The tongues 8 as illustrated are stamped out of the retaining ring and are bent outwardly so that as the retaining ring 4 is pushed into the cylindrical recess 3 in the outer ring 1, the tongues are bent radially inwardly. After retaining ring 4 has been pushed in and fully seated, the tongues spring back to their original position and snap into a ring shaped groove 9 in the outer ring so that the surfaces 10 of the tongues abut against a locking surface 9a of annular groove 9. There is a radial clearance between the axially oriented shank 7 of the retaining ring 4 and the bore surface of the cylindrical recess 3 so that the seal can adjust itself in a radial direction.

As illustrated in the drawing, sealing ring 6 which is mounted in bore 7a is supported axially on a radial support surface 11 of recess 3 and in the radius 12 of retaining ring 4 with a predetermined axial pretension. Accordingly, the seal is firmly supported in the outer ring 1 by the elastic tongues 8 and an effective seal is achieved between the outer ring 1 and retaining ring 4. The separation line between outer ring 1 and inner ring 2 is sealed by sealing lips 13, 13a of sealing ring 6 which bear with a predetermined radial pretension on spherical lateral surface 14 of inner ring 2. A wiper ring 5 which may be made of metal, for example, is located in front of the sealing ring 6. The wiper ring 5 has a slot at one point and rests with an applied axial pressure against inner surface 15 of radially directed shank 16 of retaining ring 4. The applied axial pressure is provided by the radial pretension with which slotted wiper ring 5 is mounted on spherical lateral surface 14. Wiper ring 5 can be adjusted accurately in the radial direction during assembly of the seal and rests with one edge 17 against the lateral surface 14 of inner ring 2. Accordingly, when pivoting motion occurs such as when the inner ring 2 pivots with respect to the outer ring 1, encrusted grease or dirt particles are scraped off lateral surface 14 of inner ring 2. Radial shank 16 of retaining ring 4 extends downwardly to a point just short of lateral surface 14 of inner ring 2 and forms a gap seal. In order to increase the sealing effect, the spaces 18 and 19 formed by wiper ring 5, sealing ring 6 and bearing rings 1 and 2 are filled with grease. Outer ring 1 is provided with a guide bevel 20 which facilitates insertion of the seal into the cylindrical 3 of the outer ring 1.

Even though a particular embodiment of the invention has been illustrated and described herein, it is not intended to limit the inventions and changes and modifications may be made therein within the scope of the following claims.

What is claimed is:

1. Seal for bearings having inner and outer ring (1, 2) comprising a sealing ring (6) mounted in a cylindrical recess (3) in one of the bearing rings, means defining an unobstructed air space between an axially oriented shank (7) of a retaining ring (4) having an L-shaped cross section and bore surface of said cylindrical recess (3) defining a radial clearance to permit radial adjustment of said sealing ring, said sealing ring (6) being fixed in a bore (7a) of the retaining ring (4) and projecting laterally from said retraining ring (4) and resting with axial pretension against a radial surface (11) of said one bearing ring (1).

2. Seal according to claim 1, wherein the axially oriented shank (7) of the retaining ring (4) has elastic tongues (8), which are bent outward.

3. Seal according to claim 1, wherein the axially oriented shank (7) of the retaining ring (4) points toward the radial surface (11) of the cylindrical recess (3).

4. Seal according to claim 1, wherein the sealing ring (6) is supported by the transition between the axial shank (7) and the radial shank (16) of the retaining ring (4).

5. Seal for bearings having inner and outer ring (1, 2) comprising a sealing ring (6) mounted in a cylindrical recess (3) in one of the bearing rings, means defining a radial clearance between an axially oriented shank (7) of a retaining ring (4) having an L-shaped cross section and bore surface of said cylindrical recess (3), said sealing ring (6) being fixed in a bore (7a) of the retaining ring (4) and projecting laterally from said retaining ring (4) and resting with axial pretension against a radial surface (11) of said one bearing ring (1) and sliding wiper ring (5) between an outer sealing lip (13) of the sealing ring (6) and an inner surface (15) of the radially oriented shank (16) of the retaining ring (4).

6. Seal according to claim 5, wherein the wiper ring (5) rests with an axially applied pressure against the inner surface (15) of the radially oriented shank (16) of the retaining ring (4).

* * * * *